May 2, 1944.  J. L. ANDERSON  2,347,804
CUTTING MACHINE FOR ROUND BILLETS
Filed Jan. 25, 1940  3 Sheets-Sheet 3

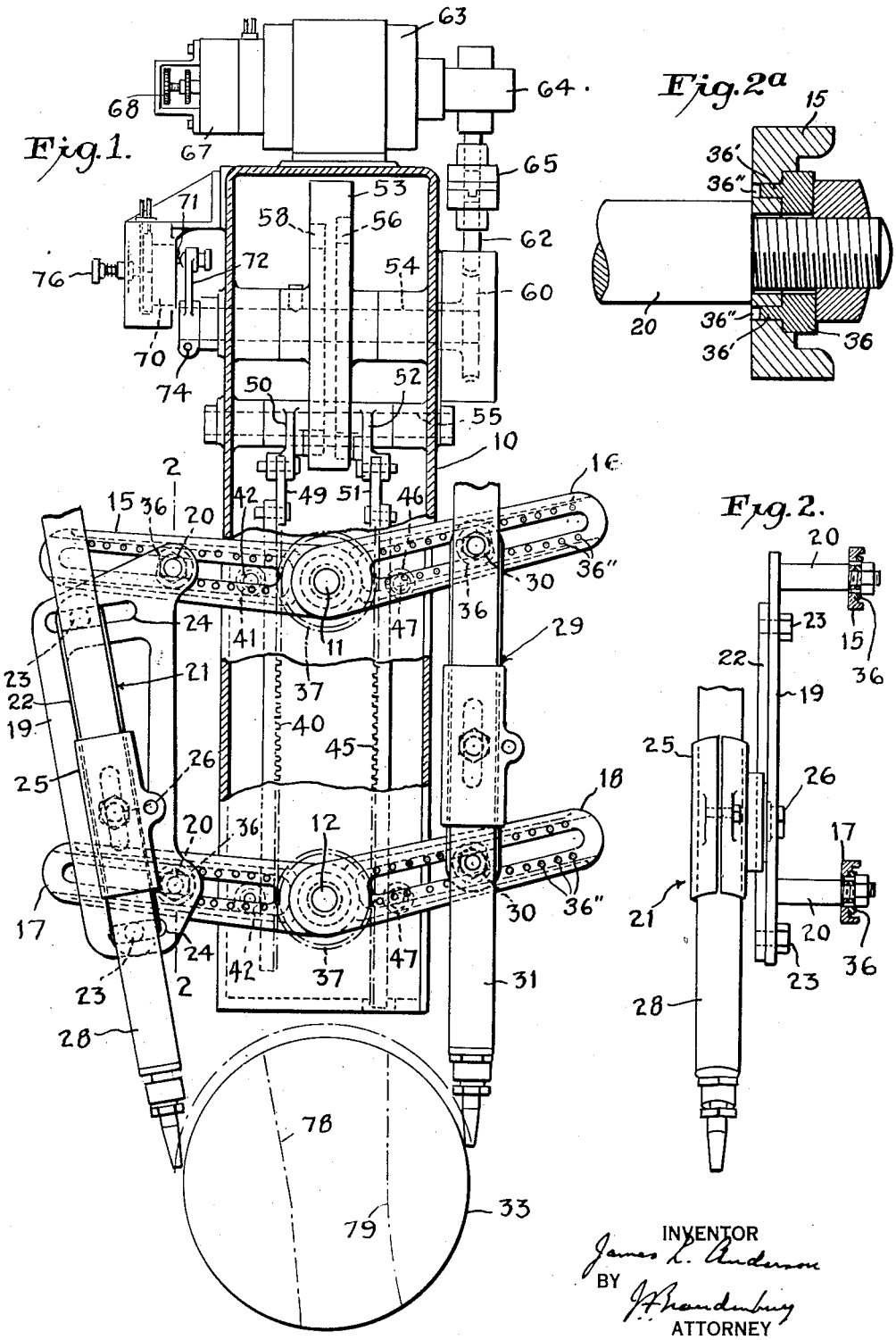

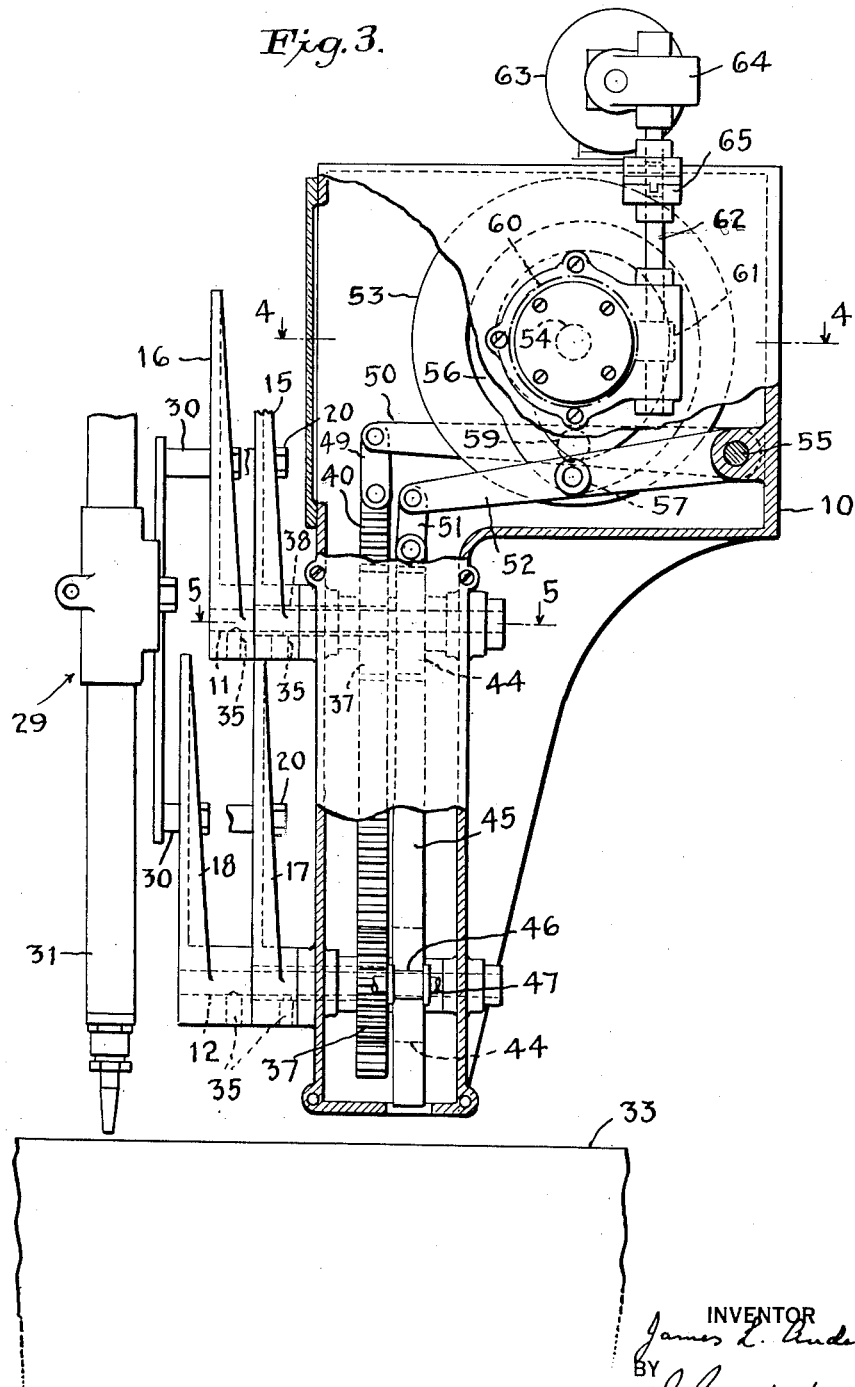

INVENTOR
James L. Anderson
BY
ATTORNEY

Patented May 2, 1944

2,347,804

UNITED STATES PATENT OFFICE 2,347,804

CUTTING MACHINE FOR ROUND BILLETS

James L. Anderson, Closter, N. J., assignor to Air Reduction Company, Incorporated, New York, N. Y., a corporation of New York Application January 25, 1940, Serial No. 315,473

6 Claims. (Cl. 266—23)

This invention relates to cutting machines, and is intended primarily for cutting round billets, but the invention is not limited to such use and can be employed on other work-pieces, especially those with which cutting torches must be moved transversely across a curved or cylindrical surface.

One object of the invention is to provide an improved cutting machine for cutting round billets or other work-pieces at higher speed. While the speed of gas cutting machines of the prior art could be increased by using larger torches, there is, after a certain size, a disproportionate increase in the volume of oxygen consumed. This invention obtains faster cuts by using two torches of moderate size and making different parts of the cut at the same time with the respective torches.

Another object of the invention is to provide novel supporting structure for moving two cutting torches across a work-piece simultaneously or during overlapping periods and along different portions of the same cut. Moving "across" the work-piece does not necessarily mean completely across, and in the preferred embodiment of the invention each torch moves only part-way across the work-piece and then returns to its starting position. The cutting machine is preferably not supported by the work and the parts of a cut billet can be removed, therefore, as soon as the cut is finished and without waiting for both torches to be returned to starting position. A work-piece can be shifted to a position to make a new cut while the parts of the machine are moving back into position to start another cycle of operation.

One feature of the invention relates to automatic variation in the torch speed in accordance with the thickness of the work-piece. It is a broad object of the invention to provide a cutting machine with improved apparatus for changing the torch speed automatically to compensate for changes in the thickness of the work, and more specifically it is an object to effect such automatic variation in the speed of two torches co-operating to cut a round billet, or other cylindrical object, along a common plane.

Other objects of the invention are to provide mechanism for moving two cutting torches along arcs in a common vertical plane; to provide automatic control apparatus for moving two torches in a given sequence, with one torch completing its cycle of operation during only a portion of the cycle of operation of the other.

Other objects, features and advantages of the invention will appear or be pointed out as the specification proceeds.

In the accompanying drawings, forming part hereof:

Fig. 1 is a front view, partly in elevation and partly in section, showing the preferred embodiment of the invention, and showing a round billet in position to be cut.

Fig. 2 is a side view of the left torch-holder of Fig. 1, the view being taken on the line 2—2 of Fig. 1.

Fig. 2ª is an enlarged detail view of a portion of the structure shown in Fig. 2.

Fig. 3 is a right side view, mostly in section, of the machine shown in Fig. 1, but with the positions of the torch-supporting arms shifted for better illustration; the operating mechanism remains in the same position as in Fig. 1.

Figure 4:
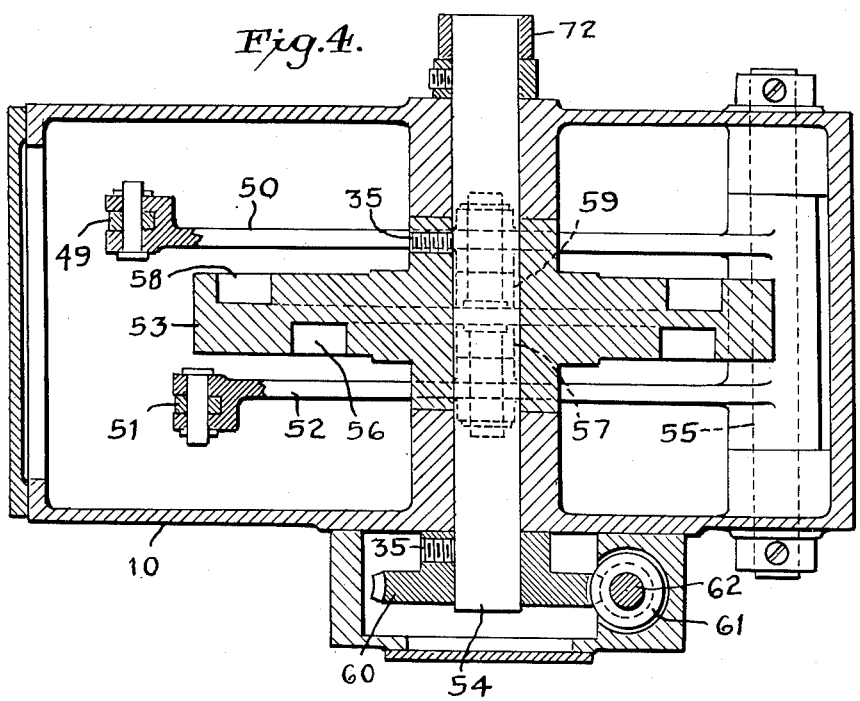
Figure 5:
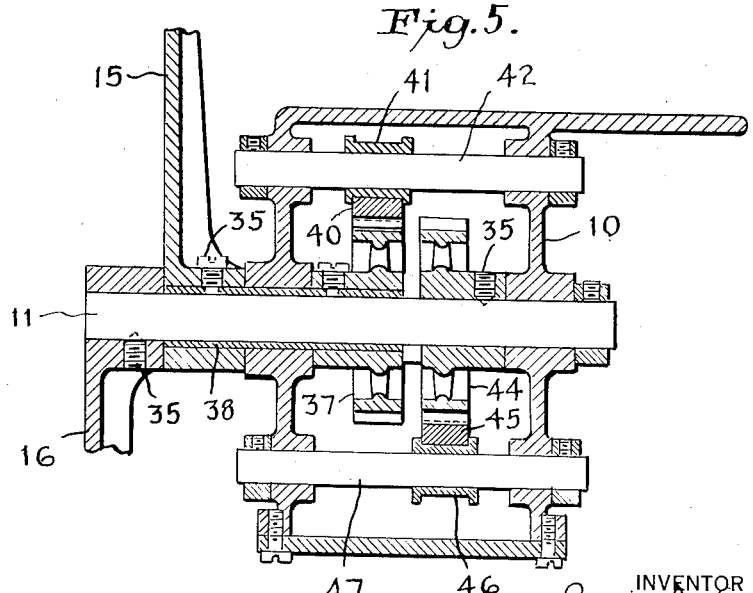

Figs. 4 and 5 are enlarged sectional views taken on the lines 4—4 and 5—5, respectively, with the torch-supporting arms in Fig. 5 shown in horizontal positions.

The machine includes a housing or frame 10 from which extend two parallel shafts 11 and 12. There are two arms 15 and 16 near the outer end of the upper shaft 11 and two similar arms 17 and 18 near the end of the lower shaft 12. The arms 15 and 17 are slotted and support a bracket 19 which is fastened to the arms by pivot connections 20 that extend through the slots in the arms. The pivots 20 are set at equal distances from the center of rotation of the arms 15 and 17 so that the bracket 19 moves parallel to itself as the arms 15 and 17 move angularly about the axes of the shafts 11 and 12.

A torch-holder 21 has a supporting member 22 connected to the bracket 19 by screws 23 that extend through slots 24 in the bracket 19 to permit angular adjustment of the torch-holder 21 on the bracket. The torch-holder 21 includes a torch clamp 25 that is connected to the supporting member by a screw 26 that extends through a slot in the supporting member of the torch-holder. This slot permits adjustment of the clamp lengthwise of the supporting member. A torch 28 is carried by the clamp 25.

A torch-holder 29 is connected with the arms 16 and 18 by pivots 30 that can be adjusted to different positions along the slots in the arms 16 and 17. Like those of the bracket 19, the pivots 30 are adjusted to equal distances from the axes of the arms by which they are carried so that the torch-holder 29, and a torch 31 carried by the holder, move parallel to themselves during angular movement of the arms 16 and 18.

The pivots 20 and 30 are adjusted to positions at distances from the axes of the shafts 11, 12 slightly greater than the radius of a round billet or other cylindrical work-piece 33 which is to be cut by the torches 28 and 31. Such an adjustment of the pivots causes the torches to follow the arc of curvature of the surface of the workpiece as the torches move inward over the workpiece from opposite sides. Shifting the pivots 20 and 30 along the arms 15—18 changes the effective length of the supporting arms and causes the torches to follow larger or smaller arcs corresponding to the curved surfaces of work-pieces of different sizes.

The arms 16 and 18 are in front of the arms 15 and 17, as shown in Fig. 3, and are fastened to the shafts, or to sleeves, by set screws 35. The lower arm 18 is set out beyond the end of the shaft 11 and upper arm 16 so that the lower arm 18 can swing past the shaft 11 and upper arm 18.

Both of the torches 28 and 31 (Fig. 1) cut in the same plane. The pivot connections 20 that support the torch 28 are long enough to locate the torch 28 at the same distance out from the frame 10 as is the torch 31. The lower arm 17 cannot move into a vertical position because it will strike the hub of the upper arm 15, but in the operation of the machine the arms 15 and 17 have only a limited angular movement and it is never necessary for them to approach a vertical position.

The bracket 19 is adjustable lengthwise of the slots in the arms 15 and 17 to make the machine capable of cutting work-pieces of different diameter. Each of the pivot connections 20 has a threaded end for receiving a nut. A plate 36 (Fig. 2ᵃ) located between the nut and the back of the arm 15 or 17 has studs 36′ extending into holes 36″ above and below the slot to prevent displacement of the pivot connection 20 lengthwise of the slot. There is a row of such holes along each of the arms 16 and 18 above the slot and a similar row below the slot.

The motion-transmitting connections for moving the arms 15 and 16 are shown in Figs. 3 and 5. Referring first to Fig. 5, the arm 15 is operatably connected with a gear 37 by a sleeve 38. The sleeve turns freely on the shaft 11 and the arm 15 and gear 37 are fastened to the sleeve by set screws 35. A vertical rack 40 is held in mesh with the gear 37 by a flanged roller 41 on a shaft 42.

A gear 44 is connected with the shaft 11 by a set screw 35 and the gear 44 meshes with a rack 45 that is held against the gear by a flanged roller 46 on a shaft 47. There are gears connected with the lower arms 17 and 18, and meshing with the racks 40 and 45. The construction is similar to that shown in Fig. 5 and the parts are indicated by the same reference character as the corresponding parts associated with the upper arms 15 and 16. By meshing with gears connected to both the upper and lower torch supporting arms 15—18, the racks 40 and 45 hold the arms 15, 17 and 16, 18, respectively, in parallel relation.

Fig. 3 shows the mechanism for moving the racks 40 and 45 up and down to rotate the gears 37 and 44, respectively. A link 49 connects the upper end of the rack 40 with a lever 50. A similar link 51 connects the upper end of the rack 45 with a lever 52. The levers 50 and 52 extend past opposite sides of a cam 53 that is centrally located in the housing on a shaft 54 to which the cam is connected by a set screw. Both of the levers 50 and 52 are fulcrumed on a shaft 55 which is supported by lugs extending inward from the back wall of the housing.

The cam 53 has a groove 56 in one face (the forward face in Fig. 3) and there is a roller cam follower 57 on the lever 52. This roller 57 extends into the cam groove 56 and has a diameter equal to the width of the cam groove so that the cam imparts a positive movement to the lever 52 both up and down.

A cam groove 58 (Fig. 4) on the other side of the cam 53 displaces a roller follower 59 carried by the lever 50. The cam is rotated by a worm wheel 60 fastened to the shaft 54 by a set screw 35. A worm 61 on a shaft 62 drives the worm wheel 60. The power connections to the shaft 62 are shown in Figs. 1 and 2, and include an electric motor 63 and reduction gearing 64 with a coupling 65 connecting the low speed shaft of the reduction gearing to the shaft 62.

The motor 63 is equipped with a centrifugal governor 67 that can be adjusted by a knob 68 to hold the motor to a given speed in a manner well understood in the art. The operation of the motor is controlled by a switch 70 (Fig. 1). This switch is closed by spring bias and has a button 71 that is displaced by cam action of an adjustable bearing member at the end of a crank arm 72 secured to the end of the cam shaft 54.

The crank arm 72 can be secured to the shaft 54 in various ways, but the crank arm preferably has a split hub that is clamped to the shaft by a screw 74. The crank arm 72 is set in such an angular position with respect to the grooves in the cam 53 that the switch 70 is opened by the bearing member at the end of the crank arm when the cam is in its "starting position."

A manually actuated push-button 76 is used to close the circuit through the switch 70 when the machine is started and until the crank arm 72 has moved far enough to permit the push-button 71 to move out to a position where the switch 70 is closed by its spring bias.

The operation of the mechanism is as follows:
When the push-button 76 is actuated to close the circuit through switch 70, the motor 63 is started and through the driving connections already described the cam 53 is rotated in a clockwise direction as viewed in Fig. 3.

The cam groove 56 moves the roller 57 closer to the center of the cam and in doing so lifts the lever 52 and causes the lever 52 to pull the rack 45 upward. This upward movement of the rack 45 turns the gears 44 and causes them to turn the shafts 11 and 12 counter-clockwise as viewed from the front in Fig. 1. The counter-clockwise movement of arms 16 and 18, which are connected with the shafts 11 and 12, causes the torch 31 to move to the left across the cylindrical surface of the work-piece 33.

The cam groove 56 is so shaped that the speed of angular movement of the arms 16 and 18 decreases as the torch 31 moves to the left and is required to cut heavier sections. If the angular movement of the arms 16 and 18 were uniform, the rate of movement of the torch 31 would increase as the arms approached the vertical. The cam groove is designed not only to overcome this speed increase with change in the angles of the arms, but to cause such a decrease in the angular speed of the arms that the horizontal displacement of the torch actually decreases in proportion to the reduction in cutting speed caused by the increase in thickness of the work.

The cam groove 58 causes the lever 50 to raise the rack 40 and move the arms 15 and 17 clockwise so that the torch 28 moves toward the right across the surface of the work-piece. The torch 28 may start to move at substantially the same time as the torch 31, but the relation of the cam grooves is preferably such that the torch 28 does not start until after the arms 16 and 18 have moved a few degrees, for example, about five degrees.

Both of the torches 28 and 31 move inward toward one another until the arms 15 and 17 have turned through an angle of approximately 60°. The end of the cut made by the torch 28 is indicated by the dot and dash lines 78. The cam groove 58 which controls the movement of the arms 15 and 17 leads away from the axis of rotation of the cam after it has moved the arms 15 and 17 through this 60° angle, and causes the lever 50 to lower the rack 40 and shift the torch 28 back to its original position shown in Fig. 1. The remainder of the cam groove 58 is of uniform radius and therefore causes no change in the position of its follower 59, lever 50, or other parts associated with the lever 50.

During the time that the torch 28 is cutting in to the line 78, the torch 31 cuts from the other side as far as the line 79. The torch 31 continues to cut after the torch 28 starts back toward its original position, however, the cam groove 56 being shaped to cause the torch 31 to move far enough to the left to complete the cut started by the torch 28. The torch 31 therefore cuts over at least to the line 78.

Because of "drag," the line 79 is not vertical or straight. The torch 28 is set at an angle so that it undercuts sufficiently to compensate for the drag in the two cuts. The angle of drag is the angle between the original direction of the cutting jet and a straight line connecting the top and bottom edges of the face of the cut. With the torch 31 set to deliver a vertical cutting jet, the other torch 28 should be set at an angle at least as great as the angle of drag of the first cut at the section where the cuts meet. The angle of the torch 28 is preferably adjusted to make the lower end of the line 78 far enough to the right to be reached by the cut of the torch 31 by the time the torch 31 reaches the upper end of the line 78.

After the torch 31 has moved to the left to make the cuts meet, the cam groove 56 leads outward away from the axis of rotation of the cam and causes the arms 16 and 18 to return to their original positions shown in Fig. 1.

For cutting billets or other work-pieces of different diameter, the torch-holders are set at different positions along the slots in the arms 15—18. A different angular velocity for the arms 15—18 is desirable when the setting of the torch-holders is changed lengthwise of the arms because such an adjustment changes the lineal though not the angular length of the arc along which the torch moves in a unit of time. Compensating adjustment is made by moving the knob 68 to change the setting of the governor 67 so that the motor 63 runs at a different speed. The speed variation in the angular movement of the arms 15—18, however, from a maximum at the start of the cut to a minimum when the torch is over the center of the work, remains proportionately the same and makes the same cam 53 suitable for use with work-pieces of different diameters.

The preferred embodiment of the invention has been described, but changes and modifications can be made, and some features of the invention can be used without others. Terms of orientation in the description and claims are, of course, relative.

I claim:

1. An oxygen cutting machine for cutting round stock including in combination a supporting frame located above a work-piece to be cut, two torch-holders, independently movable means on the frame for supporting the respective torch-holders and shifting said holders along arcuate paths corresponding to the surface of the work-piece to be cut, and apparatus for moving the supporting means in opposite directions to shift the torch-holders and the torches supported by said holders across the work-piece from opposite sides, said apparatus including an electric motor, mechanism operated by the motor to move one torch for a given distance across the work-piece and then back to its starting position, means operated by said motor for starting the movement of the other torch shortly before the first torch and moving said other torch in one direction during the entire remaining movement of the first torch both forward and backward to starting position, and automatic means for returning said other torch to its starting position after its cutting operation.

2. A cutting machine including a torch support, a lever for moving the torch support, a motor, and motion-transmitting connections between the motor and said lever including a cam that displaces the lever at a variable rate calculated to produce a given variation in the speed of the torch support to compensate for changes in the thickness of the work.

3. A cutting machine including two torch supports and means for moving the torch supports in opposite directions across a work-piece, said means including a motor, a cam operated by the motor, two grooves in the cam, and two cam followers, one operating in each of said grooves and connected with one of the torch supports.

4. A cutting machine including a housing, two parallel sleeves extending through bearings in a wall of the housing, a torch-supporting arm secured to each of the sleeves outside of the housing, a gear attached to each of said sleeves inside of the housing, a torch-holder connected with the arms and movable parallel to itself along an arcuate path during angular movement of the arms, means for holding the arms in parallel relation and for moving the arms angularly about their axes, said means including a rack that meshes with the gears attached to both sleeves, two other torch-supporting arms, a torch-holder connected with said other arms for movement along an arcuate path in the same plane with the first torch-holder, axles for said other arms comprising shafts rotatable in the sleeves as bearings and coaxial with said sleeves, a gear on each of said shafts within the housing, a rack meshing with the gears on said shafts, two levers pivotally connected at their ends with the housing, a link connecting the other end of each lever with one of the racks, a cam located between the levers, a cam groove in each side of the cam, a follower on each lever extending into one of the cam grooves, each of said cam grooves being shaped to produce a given cycle of operation of one of the torch-holders, a motor, motion-transmitting connections through which the motor rotates the cam, a switch in the motor circuit, and a member associated with the cam-driving connections for operating said switch to stop the motor at the end of a revolution of the cam.

5. A cutting machine comprising a holder for a cutting torch, mechanism for moving the holder and torch parallel to themselves and with horizontal components of movement across the top of a work-piece during a cutting operation, and a second torch-holder in such relation to the first torch holder that a cutting torch supported by the second holder is in position to direct a cutting jet at an angle to the direction of the cutting jet from the first torch, which angle exceeds the drag angle of the cut made by the first torch, mechanism for moving the second torch-holder and torch parallel to themselves and with horizontal components of movement across the top of the work-piece and in the opposite direction to the horizontal movement of the first torch-holder and torch, the positions and movements of said torch-holders being in such relation to one another that both torches cut in substantially the same plane.

6. A machine for cutting round work-pieces including two pairs of supporting arms, the arms of each pair being in substantially parallel relation and being supported for rotation about parallel axes each of which is common to the corresponding arms of the two pairs, a torch-holder supported by each pair of arms in position to move a torch so that it cuts in the same plane as a torch supported by the other holder, and each of said torch-holders being supported by said arms for movement along an arc corresponding to the surface to be cut, and apparatus for swinging one pair of arms to the left and the other pair to the right about said parallel axes while the torches in said holders are cutting across a work-piece.

JAMES L. ANDERSON